Jan. 3, 1950 H. C. BOARDMAN ET AL 2,492,960
LIFTER ROOF STORAGE TANK
Filed Dec. 20, 1945 2 Sheets-Sheet 1
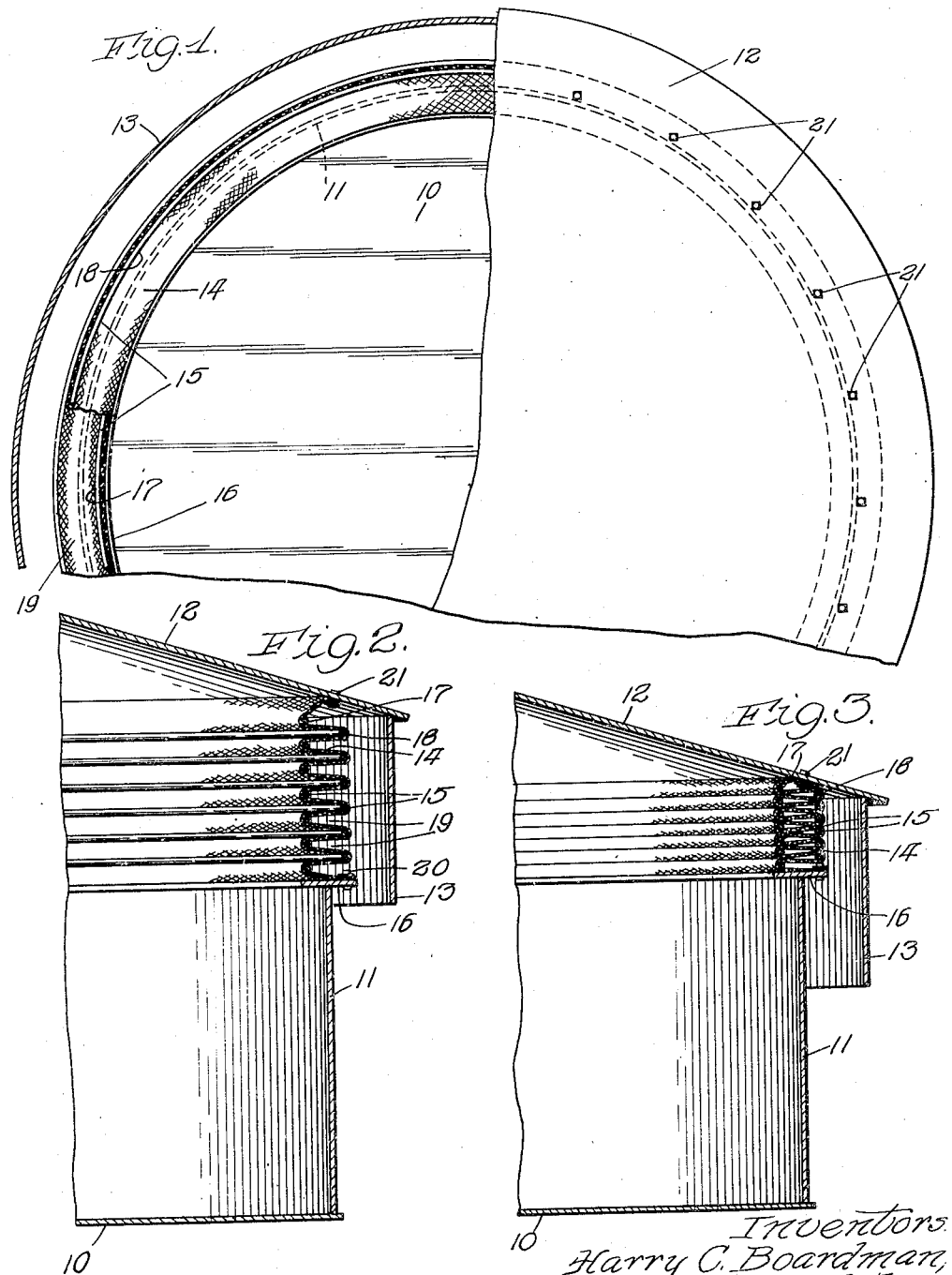

Jan. 3, 1950     H. C. BOARDMAN ET AL     2,492,960
LIFTER ROOF STORAGE TANK
Filed Dec. 20, 1945     2 Sheets-Sheet 2
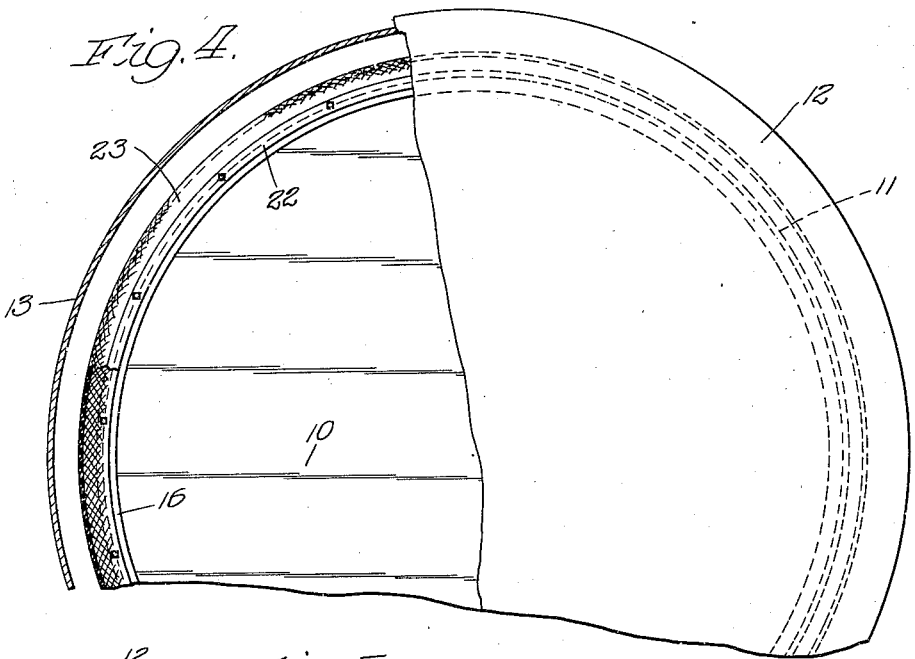
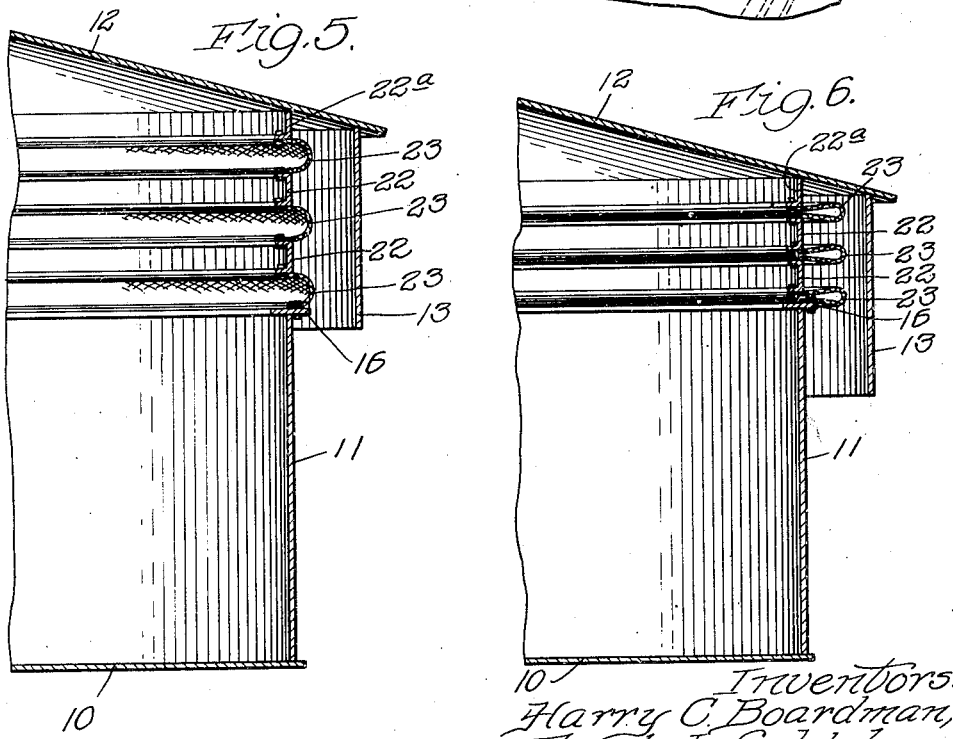
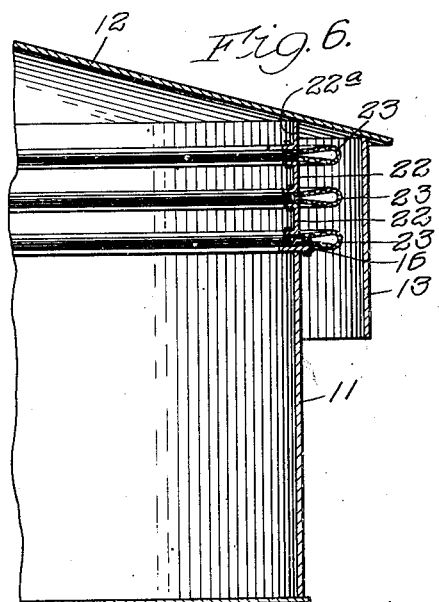
Inventors.
Harry C. Boardman,
Fred L. Goldsby,
Clifford M. Orr,
By Christon, Wiles, Schroeder, Merriam & Hyrne
Attys.

Patented Jan. 3, 1950

2,492,960

UNITED STATES PATENT OFFICE 2,492,960

LIFTER ROOF STORAGE TANK

Harry C. Boardman, Fred L. Goldsby, and Clifford M. Orr, Chicago, Ill., assignors to Chicago Bridge & Iron Company, a corporation of Illinois Application December 20, 1945, Serial No. 636,224

4 Claims. (Cl. 48—178)

This invention relates to a lifter roof storage tank for the storage of gases under pressure, and relates particularly to a seal for sealing the area between the roof and the bottom portion of the tank.

Lifter roof storage tanks are used for the storage of gases under pressure. They are so constructed that the roof rises and falls as gas pressure within the tank is increased and decreased. It is necessary in tanks of this type that a sealing means be provided for sealing the area between the storage portion and the roof so as to provide tight seal at all positions of the roof.

We have invented a lifter roof tank having a seal that is simple yet provides a positive sealing action at all positions of the roof. The invention comprises, broadly, a storage tank having a storage portion comprising a bottom with upstanding sides, a roof thereover, and a flexible sealing member attached to the sides and the roof and sealing the area therebetween. The flexible sealing member has spaced reinforcements located around it with the reinforcements preferably arranged substantially horizontally to divide the sealing member into sections. The reinforcements are movable vertically with respect to each other.

The invention will be described as related to the embodiments shown in the accompanying drawings. Of the drawings Fig. 1 is a fragmentary plan view of a tank embodying the invention with portions broken away; Fig. 2 is a fragmentary vertical section through the lifter roof storage tank of Fig. 1 with the roof in raised position; Fig. 3 is a view similar to Fig. 2 with the roof in its lowermost position; Fig. 4 is a view similar to Fig. 1 showing an alternate type of construction; Fig. 5 is a fragmentary vertical section showing the roof of Fig. 4 in raised position; and Fig. 6 is a view similar to Fig. 5 showing the roof in lowered position.

The lifter roof storage tank shown in Figs. 1, 2 and 3 comprises a bottom portion 10 having upstanding side walls 11, a roof 12 having a depending weather skirt 13 arranged beyond the walls 11, and a flexible sealing member 14 extending between the top of the walls 11 and the roof 12. The sealing member 14 is provided with reinforcements in the form of circular rods 15.

On top of the upstanding side walls 11 there is provided an annular platform 16 upon which the folded sealing member 14 and the roof 12 will rest when the roof is in its lowest position. The weather skirt 13 extending downwardly from the roof 12 is long enough so as the extend below the platform 16 when the roof is in its highest position. This protects the sealing member from the weather.

The circular rods 15 serving as reinforcements for the sealing member 14 have alternate rods 17 of one diameter, and the other rods 18 of a larger diameter. This provides accordion-like pleats 19 in the sealing member. As the roof rises and falls these pleats expand and contract. Thus the reinforcing rods 15 serve not only to strengthen and reinforce the sealing member, but also prevent injury to the member from sharp folds when the tank is substantially empty of gas. When the tank is empty, as shown in Fig. 2, the sealing member 14 will be arranged in folds on top of the platform 16. As shown the rods 15 are stacked one on top of the other. This may not be the exact arrangement in actual practice, but in any event injury to the sealing member will be prevented.

The bottom edge of the sealing curtain 14 is fastened to the platform 16 by means of a plurality of bolts 20. The other edge of the sealing member is fastened to the roof by means of a plurality of second bolts 21.

In the embodiment shown in Figs. 4, 5 and 6 the reinforcing members are substantially horizontal circular channels 22 with the bottom portions arranged vertically. These channels all have substantially the same diameter and are arranged one above the other with sections 23 of flexible sealing member between two adjacent channels 22. The top channel 22a is fastened to the roof 12 of the tank, while the bottom section of sealing member is fastened to the platform 16 on top of the side walls 11. Each section of sealing member carries the stresses due to gas pressure as a torus. All the metal channels will be in tension due to the outward pressure of the gas.

In both embodiments of the invention the weight of the sealing member and the rods or channels is carried by the sealing member. Therefore when the roof is in the up position the spacing between rods or channels will be progressively more from the bottom of the sealing member to the top.

Although the channels 22 are shown having substantially the same diameters, they may be made of different diameters if desired. One construction is to have the diameter of each channel smaller than that of the channel immediately beneath it. In this construction the channels would be side by side on the platform 16 when the roof is in its down position instead of aligned one on top of the other, as shown in Fig. 5. The channels could also be made so that each channel has a diameter greater than the one immediately beneath it, and this side by side arrangement would also occur. In both of these instances the shelf 16 would need to be wider than is shown in the drawings.

The flexible sealing member may be any gas impervious material capable of withstanding a considerable pressure. One such material is a fabric impregnated with a flexible gas impervious solid.

The storage tank shown and described herein may be provided with any of the ordinary types of leveling, guiding, and stabilizing apparatus to maintain the roof level and guide it in its travel. The ordinary gas conduit pipes, valves, and safety valves are also provided. All this apparatus is well known in the art.

Having described our invention as related to the embodiments shown in the accompanying drawings, it is our intention that the invention be not limited to the details of description unless otherwise specified, but rather be construed broadly within its spirit and scope as set out in the accompanying claims.

We claim:

1. A lifter roof storage tank comprising a substantially cylindrical bottom portion having an open top, a roof thereover having a periphery extending beyond the edge of the open top, a flexible sealing member attached to the top edge of the cylindrical portion and to the roof a plurality of continuous, substantially circular horizontal reinforcements attached to the sealing member to divide it into horizontal sections with alternate reinforcements having a larger diameter than the intermediate reinforcements, a downwardly extending weather skirt at the edge of the roof with said skirt extending below the top edge of the cylindrical portion when the roof is in its highest position, and a platform adjacent the top edge of the cylindrical portion upon which the sealing member and reinforcements rest when the roof is in its lowest position.

2. The storage tank of claim 1 wherein the reinforcements are substantially circular rods.

3. The storage tank of claim 1 wherein the reinforcements are substantially circular rods with the alternate rods attached to one side of the sealing member and with the intermediate rods attached to the other side of the sealing member.

4. The storage tank of claim 1 wherein the reinforcements are substantially circular rods with the alternate rods attached to the inside of the sealing member and with the intermediate rods attached to the outside of the sealing member.

HARRY C. BOARDMAN.
FRED L. GOLDSBY.
CLIFFORD M. ORR.

REFERENCES CITED

The following references are of record in the file of this patent:

UNITED STATES PATENTS

| Number | Name | Date |
|---|---|---|
| 2,095,752 | La Brie | Oct. 12, 1937 |
| 2,308,479 | Young | Jan. 12, 1943 |

FOREIGN PATENTS

| Number | Country | Date |
|---|---|---|
| 368 | Great Britain | Feb. 9, 1859 |